Aug. 6, 1968  J. J. GREENBURG ET AL  3,395,503

SPRING MOUNTED ADJUSTABLE BOOM CONSTRUCTION

Filed Jan. 13, 1967  2 Sheets-Sheet 1

INVENTORS
Jesse J. Greenburg
William R. Barrett

BY
ATTORNEYS

Aug. 6, 1968     J. J. GREENBURG ET AL     3,395,503

SPRING MOUNTED ADJUSTABLE BOOM CONSTRUCTION

Filed Jan. 13, 1967     2 Sheets-Sheet 2

INVENTORS
Jesse J. Greenburg
William R. Barrett

BY Scofield, Kokjer, Scofield & Lowe
ATTORNEYS

United States Patent Office 3,395,503
Patented Aug. 6, 1968

3,395,503
SPRING MOUNTED ADJUSTABLE
BOOM CONSTRUCTION
Jesse J. Greenburg, 201 E. 5th St., and William R. Barrett,
211 N. Willow St., both of Solomon, Kans. 67480
Filed Jan. 13, 1967, Ser. No. 609,155
10 Claims. (Cl. 52—114)

ABSTRACT OF THE DISCLOSURE

A field spraying boom having a spring mounted and supported center section with two end sections flexibly extending from the ends thereof. The mounting of the boom relative to a prime mover facilities the raising, lowering and angular adjustment of the boom and reduces extreme damaging vibrations during high speed operation over irregular terrain.

*Brief description and background of the invention*

The invention pertains to mobile booms which support necessary plumbing used to apply liquid fertilizer, fungicides, insecticides and the like, to large tillable fields. Conventional plumbing extends from a tank, usually located on the prime mover, to the nozzle positions which are selectively located at spaced intervals along the length of the boom. It is quite common for the plumbing supporting booms used in this manner to have spans up to fifty (50) feet or more. As a result, the flexure and vibration of the end portion of the end sections of a wide span boom can cause considerable damage when rough and irregular terrain is encountered unless the prime mover carrying the booms travels at an exceedingly low rate of speed.

One of the principal features of the invention resides in the spring mounting of the center section of the boom to the prime mover (either two-wheel or four-wheel drive vehicles) thereby stabilizing the boom end sections by reducing unwanted vibrations and flexure.

A heavy leaf spring is used to attach the center section of the boom to the prime mover. The leaf spring effectively supports a lift structure, pivotally interconnected in the form of a parallelogram, which in turn connects and supports the boom center section. The parallelogram lift structure has one member fixedly connected relative to the prime mover in a substantially vertical plane with the remaining structural members of the lift structure pivotally interconnected so that the outer end of same may be raised or lowered in parallel vertical planes. Hydraulic lift cylinders facilitate the pivotal movement of the parallelogram structure and provide a full and complete operative height adjusting control for the complete boom.

The center section of the boom is affixed to the lift structure by a rotatable hub and further includes a means for angularly adjusting the position of the center section relative to the lift structure.

The end sections are hingedly connected to the center section enabling same to swing to the rear as they contact field obstacles and are spring biased to return to their normal operating position once the obstacle has been passed by and no longer hinders the forward movement of the boom end sections. A combination sprocket and bicycle type chain arrangement maintains equal tension on each end section's spring biasing means so that the return to normal operating position is accomplished with a preselected amount of spring tension closing force. Shock absorbers further limit the closing or slamming of the spring biased end sections as they return thereby precluding injurious effects to the hinged connections with the center section.

One of the primary objects of the invention is to decrease the time now required to spray large tillable fields. This object is accomplished, in part, by the improved spray boom spring mounting that reduces vibration in the boom and allows the boom carrying prime mover to travel at a considerably increased rate of speed during the spraying operation. Tests have shown that the spraying of large fields may now be accomplished with the instant invention in one-fifth (⅕) the time previously required.

Another object of the invention is to provide an unique interconnecting boom-lift structure which allows the vertical positioning of the boom supporting structure to be hydraulically moved to various desired operating heights.

Another object of the invention is to provide an unique spring-biasing arrangement for each hingedly connected end section of a mobile field sprayer. This feature, in combination with the spring mounting of the boom center section mentioned supra, operates in a cooperative manner to allow the relative high speed of the boom carrying prime mover. When rough and irregular terrain is encountered, the above-mentioned spring mounting substantially eliminates the shock forces that would ordinarily be transmitted through the prime mover and the mountings to the boom sections. The hingedly connected end sections in combination with the unique spring-biasing means associated with each end section allows same to contact field obstacles, swing opposite the direction of motion on the hinged connections, and be returned to the normal operating position under constant tension once the field obstacle has been successfully negotiated.

A still further object of the invention is to provide a mobile field sprayer of the character described which hydraulically controls the positioning of the boom sections in such a manner that an operator may raise the boom, fold back the end sections for highway and road travel or lower the boom into the operative spraying position and release the end sections for conventional spraying operation.

Another object of the invention is to provide a mobile field sprayer having a flexible boom of the character described which is rugged, reliable, and easily disassembled for cleaning or storing purposes. The interconnecting of the center section of the boom with the lift structure also includes an unique means for changing the angular orientation of the boom relative to the lift structure and prime mover as may be dictated by the field terrain.

Other and further objects of the instant invention will appear in the course of the following description thereof.

In the drawings, which form a part of the instant specification and are to be read in conjunction therewith, embodiments of the invention are shown and, in the various views, like numerals are employed to indicate like parts.

Figure 8:
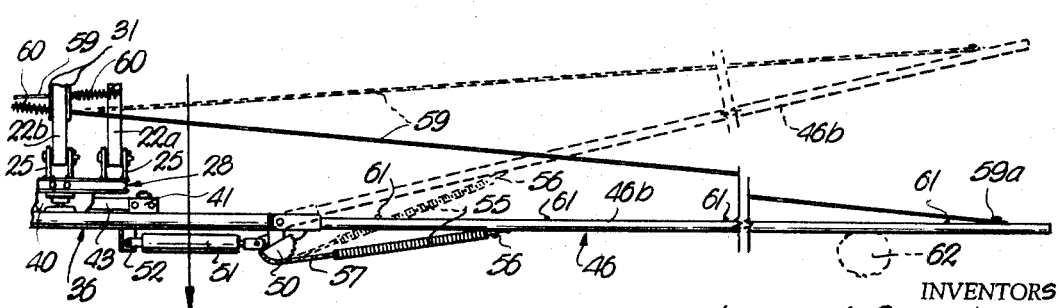
Figure 7:
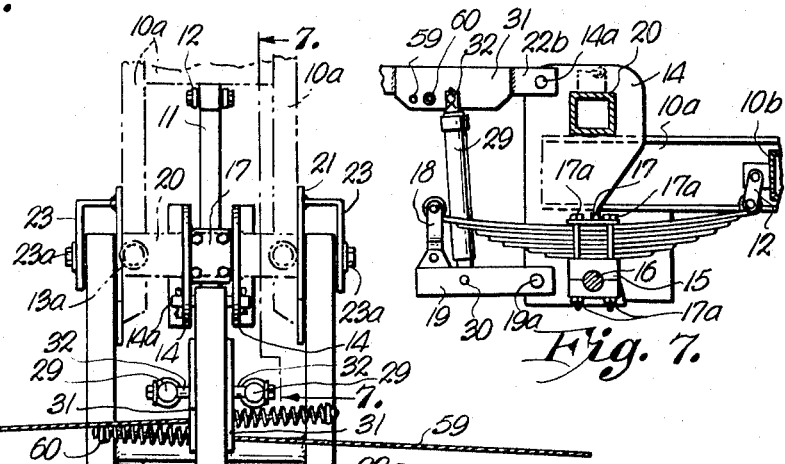
Figure 3:
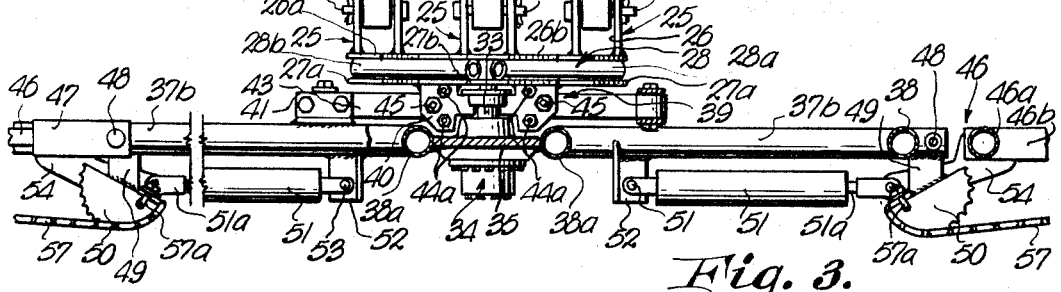
FIG. 3 is a view taken generally along the line 3—3 of FIG. 2 in the direction of the arrows of the top of the center section of the boom and the structure that interconnects the prime mover and the center section.

FIG. 7 is a sectional side view taken generally along the line 7—7 of FIG. 3 in the direction of the arrows, showing the interconnection of the main support spring with the prime mover frame and lift structure; and FIG. 8 is a top plan view of one of the two identical end sections of the subject boom showing the return spring bias arrangement and the hinged connection with a portion of tthe center section, the broken line position of the end section indicating the position taken by the end section upon contact with field obstacles.

*Detailed description of the invention*

Figure 1:
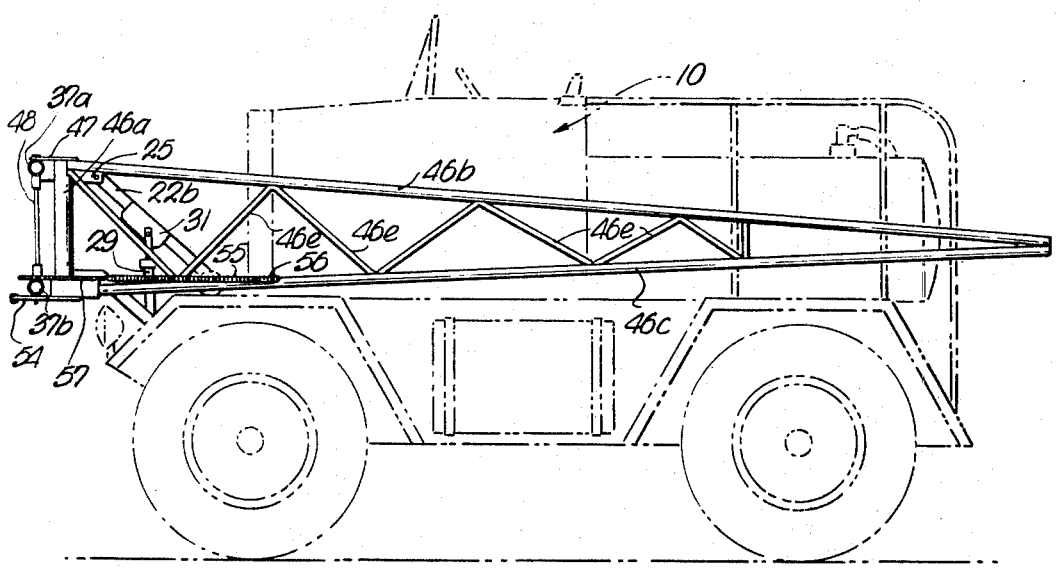
FIG. 1 is a side view of a mobile field sprayer having the subject boom mounted thereon, same being shown with the center section raised and the end sections folded back as would be the case during road travel.

Referring now more particularly to the drawings, reference numeral 10 represents the prime mover depicted in broken lines in FIG. 1. Prime mover 10 may take on various forms, however it should be understood that either a two-wheel or four-wheel drive vehicle may be employed and that in some instances a vehicle resembling a self-propelled combine may be efficiently used with the subject plumbing supporting boom.

A heavy duty leaf spring 11 (FIGS. 4 and 7) is fixedly connected to the cross frame 10b of prime mover 10 by shackle 12. This shackle (12) fixedly connects spring 11 at its rearward end portion to the vehicle frame while the forward portion of the spring extends past the forward extremity of the prime mover frame structure. A tubular support structure including horizontal rod 13 which is weldedly connected to the forward fenders of prime mover 10 and depending rods 13a comprise further supporting means for the spring mounting of the subject boom. Rods 13a abut and are weldedly connected to the upper surface of frame 10a resulting in a rigid and secure structure. A hollow rectangularly sectioned beam 20 transversely spans the two longitudinally extending frame members 10a and is welded to same along their mutually contacting surfaces. A pair of vertical plates 14 are appropriately apertured, centered on beam 20 and welded thereto thusly forming opposed mounting surfaces that are extremely secure and rigid relative to the frame of the prime mover.

Figure 4:
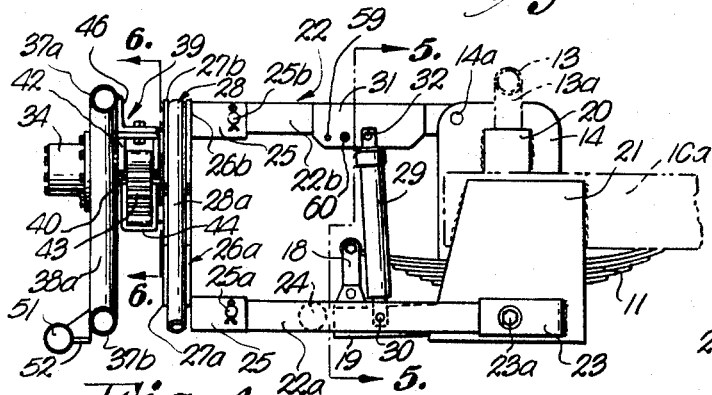
FIG. 4 is a view taken generally along the line 4—4 of FIG. 2 in the direction of the arrows, of the side of the interconnecting structure, boom center section and portions of the prime mover.
Figure 5:
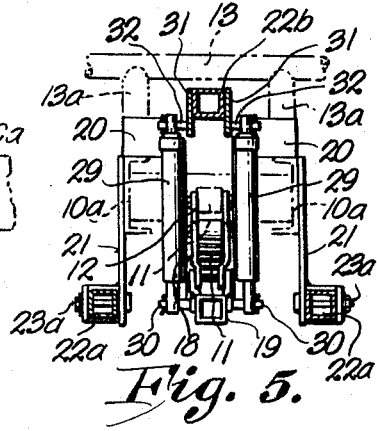
FIG. 5 is a view taken generally along the line 5—5 of FIG. 4 in the direction of the arrows, of the front of the hydraulic lift cylinders, spring mount and supporting means with the parallelogram lift structural members shown in section.

The center portion of spring 11 is supported by the upper surface of a box-type bearing 15. Shaft 16 is weldedly connected between the two mounting plates 14, thusly providing a fixed member for bearing 15. Plate 17 is bolted at 17a to the upper center portion of spring 11 thereby clamping the upper surface of the box bearing 15 to the spring so that rotative motion on shaft 16 is still possible. The forward end of spring 11 is shackle mounted as indicated by the numeral 18, same being supported from the end portion of a hollow square sectioned structural support member 19. The rearward end of the structural support member 19 is supported for pivotal movement between plates 14 by pin 19a. Accordingly, the rearward end of spring 11 is fixedly connected to the prime mover, however the center portion of the spring and the forward end of same are connected to allow slight rotative movement of the forward end in a counterclockwise manner as seen in FIGS. 4 and 7.

A second pair of mounting plates 21 are welded to the exterior of the forward portion of each frame member 10a and lie in parallel planes on either side plates 14. These mounting plates are constructed of a heavy gauge metal and serve in part as a support means for the parallelogram lift structure generally indicated by the numeral 22.

The above-mentioned lift structure is essentially comprised of four principal sides, three of which are vertically movable with the fourth side being a fixed vertically immobile structure comprising, in the main, the parallel support plates 21.

The lower side of the lift structure includes parallel structural members 22a. Bracket 23 are centered on the lower exterior end portion of each plate 21. Connecting pins 23a pivotally connect structural members 22a to each side of supporting plates 21 within brackets 23. Coupling member 24 spans the two parallel members 22a and lends stability and support as well as maintaining the parallel condition of the structural members at their forward end extremities.

A single upper structural member 22b is pivotally connected between supporting plates 14 via pin 14a. Structural members 22a and 22b are identical in size, including length and cross section and have at their outer end portions three clevis type brackets 25 pivotally connected with the forward ends of lower structurals 22a and the upper structurals 22b at pins 25a and 25b, respectively.

The forward ends of each clevis bracket 25 have a vertically positioned gusset-type abutment plate 26 welded at right angles to each end face thereof. For example, the lower clevis brackets have gusset plates 26a connected thereto while the upper clevis bracket supports plate 26b. Similar sized and shaped gusset plates 27a and 27b are located opposite plates 26a and 26b, respectively, and serve to weldedly mount a triangular shaped frame generally indicated by the numeral 28. Triangle frame 28 is comprised of three equal lengths of pipe 28a, 28b and 28c (not shown) which when weldedly connected between the three pairs of gusset-type abutment plates form the forward end of the parallelogram lift structure 22. Since the rearward end of lift structure 22 is fixed in a vertical plane and since the forward end, e.g. the triangle frame 28, is parallel thereto, any vertical pivotal movement of the structure moves frame 28 in parallel vertical planes.

A pair of hydraulic lift cylinders 29, connected with conventional hydraulic lines (not shown), are pivotally supported at their lower ends (via the piston portion) on either side of a structural support 19 by connecting pins 30. The upper end of each hydraulic cylinder is pivotally connected with the upper structural member 22b of parallelogram lift structure 22. The upper connection utilizes plates 31 which are welded in a parallel opposed manner to each side of structural member 22b. Each plate 31 is appropriately apertured to facilitate the pivotal pin connection 32 with the upper end of each hydraulic cylinder 29. Accordingly, the vertical positioning of the outer end of the lift structure 22 (triangle frame 28) is controlled by the activation of hydraulic cylinder 29.

Since the lower portion of the cylinder piston combination is anchored and connected to the support member 19 which is in turn pivotally connected to the frame of the prime mover and spring cushioned by the outer end of spring 11 via the shackle connection 18, the hydraulically caused extension of lift cylinder 29 will pivot the entire parallelogram lift structure (with the exception of the fixed inner member) upwardly on the respective pivot pins, however maintaining the outer end of the lift frame in a vertical plane (that being parallel to the fixed inner member as per a typical parallelogram action). It should be pointed out that the upper end of hydraulic lift which is pin connected via pin 32 to the upper member 22b extends forwardly of the lower piston connection with structural support 19. This arrangement gives an added leverage to the hydraulic cylinder during the lifting operation. Also a safety cable (not shown) may be provided to hold the entire lift structure off the ground in case of failure of a holding pin or other mechanical failure.

Figure 6:
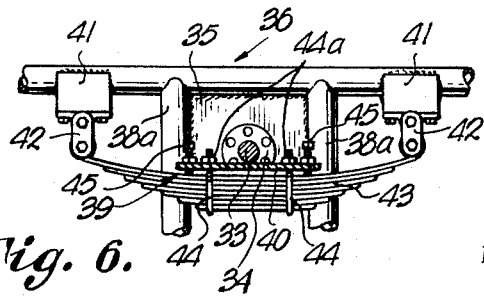
FIG. 6 is a partial view of the center section and leveling means as seen from the rear taken generally along the line 6—6 of FIG. 4 in the direction of the arrows.

Turning now to the attachment of the center section of the plumbing supporting boom to the lift structure, a single shaft 33 (see FIGS. 3 and 6) is weldedly connected and journaled in the central portion in a non-rotative manner to abutment gusset plates 26b and 27b. A conventional hub 34 containing suitable bearings is positioned over the fixed shaft 33 and secured thereto for rotary movement on same. Hub 34 extends through an aperture in an attachment plate 35 and is either bolted or welded thereto in a fixed manner. Plate 35 serves as the primary means for connection of the hub with the boom center section.

Turning now to a more detailed description of the center section, generally indicated by the numeral 36, two elongate tubular structural members 37a and 37b comprise the span of the center section. These tubular structural members are interconnected and rigidly supported by shorter vertically oriented tubular structural members generally indicated by the numeral 38. Two of the vertical supports, hereinafter identified by the numeral 38a, are located in the center portion of the center section relatively close together and provide a welding surface for the attachment plate 35. Accordingly, when attachment plate 35 has been welded on its upper surface to the upper horizontal tubular member 37a and on each side surface to the vertical support members 38a, a very substantial and strong connection is therefore accomplished between the lift structure and the center section of the boom.

As will be seen, with shaft 33 fixed to the lift structure and the hub member 34 allowing rotation of the center section on the shaft, a means must be supplied to fixedly locate the center section on shaft 33 during the operation of the spring apparatus. The fixing of center section 36 on shaft 33 is primarily accomplished by the combination leveling and locking device generally indicated by the numeral 39 and shown in detail in FIG. 6.

The combination locking and leveling device includes a locking plate 40 that is weldedly connected with gusset plate 27b, same being welded to the triangular frame 28, as discussed above. Plate 40 is positioned directly under shaft 33 and which may also be fixedly connected to the plate, however the important factor being that the plate 40 is fixedly located relative to the forward end of lift structure 22. Mounting brackets 41 are positioned on either side of the two centrally located vertical structural members 38a and further include shackle members 42 depending therefrom for the purpose of connecting and supporting leaf spring 43. When connected with shackles 42, leaf spring 43 is positionable directly under leveling plate 40. A pair of U-clamps 44 are positioned around leaf spring 43 near the center portion thereof and extend up through appropriate apertures in leveling plate 40 and are bolted thereto at 44a. Leveling bolts 45, located outside of the U-bolts 44, extend through suitable threaded apertures and may be tightened in contact with the upper surface of leaf spring 43 for level adjusting purposes.

Figure 2:
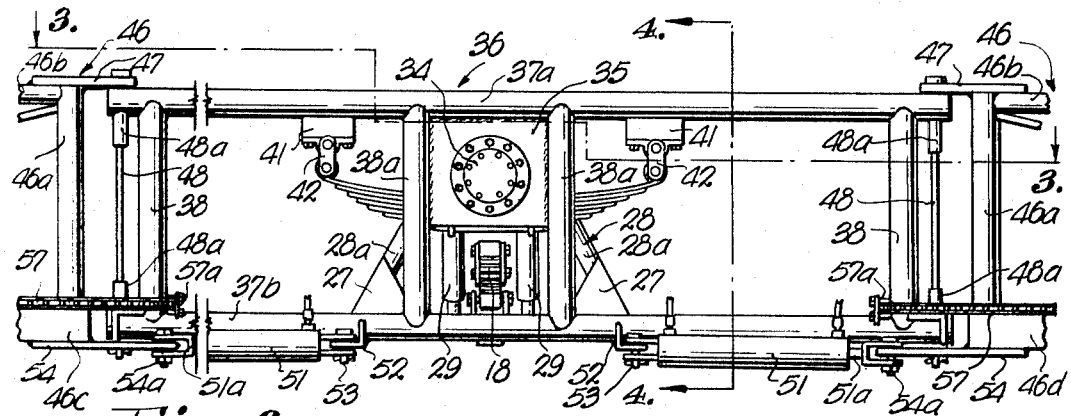
FIG. 2 is a front elevational view of the center section of the boom.

The above-described combination leveling and locking connection allows center section 36 to be rotated on shaft 33 and locked at any desired position within a 360° arc. For example, if the orientation of the center section (and necessarily, the entire boom) need be changed, the leveling device provides the necessary angular adjustment. To change the angular orientation of the center section, it is necessary to select and loosen one set of U-bolts 44 and appropriately adjust the extending length of bolt 45 against the upper surface of leaf spring 43, either up or down, and then retighten the loosened bolts 44, thusly moving center section 36 on shaft 33 to a new angular position relative to the lift structure. For example, if it is desired to raise the left end portion of center section 36 shown in FIGS. 1 and 2, then the bolts 44 to the left of shaft 33 are loosened, leveling bolt 45 to the left of shaft 33 is drawn upwardly the requisite amount and the bolts 44 are retightened. This procedure accordingly lifts the left end portion of the center section to its desired angulation. The retightening of the left hand bolts 44 against the leveling plate 40 essentially has the effect of pulling the left hand portion of spring 43 up in a clockwise direction, as seen in FIGS. 2 and 3. The opposite procedure may take place when it is desired to return the left end of the section to its former position and the right end of the section may be raised or lowered in a similar manner.

As seen in FIG. 2, the end vertical spacer members 38 are overlapped by the end extremity portions of both upper and lower tubular structural members 37a and 37b, respectively, thereby providing an area for hingedly connecting the end sections to the center section.

The end sections, hereinafter identified by the numeral 46, are identically constructed and essentially comprise a vertically oriented end spacer 46a with elongate converging tubular upper and lower structural members 46b and 46c, respectively. Opposed flange plates 46d are welded to the lower end of vertical spaced 46a for the purpose of facilitating the upward angulation of lower structural member 46c. Angularly oriented spacers 46e further cooperate to give strength and rigidity to the converging end sections. Both converging tubular support members are weldedly interconnected at their outer ends, thereby forming an integral structure.

Continuing with the connecting of the end sections with center section 36, an upper swivel plate 47 is weldedly connected to the upper surface of the combination vertical end of spacer member 46a and the structural member 46b. Swivel plate 47 is apertured at its outer end and is adaptable to be aligned with appropriate apertures in the end extremity portions of both tubular support members 37a and 37b. An elongate pin 48 extends through the aligned aperture in swivel plate 47 and through added orienting sleeves 48a. This arrangement allows and effects a swivel hinge connection for the end sections 46 to move or swing relative to center section 36.

A mounting flange 49 is welded to the forward lower end portions of the center section in line with the supporting sleeves and swivel pin 48. Flanges 49 support a welded half sprocket 50 thereon, the use of which will be discussed later.

Each end section has a hydraulic cylinder 51 associated therewith for the purpose of moving the end section to the rear on its swivel hinge connection. Hydraulic cylinders 51, connected with conventional hydraulic lines (not shown) are supported from the lower tubular support member 37b near each end section by a forwardly projecting mounting bracket 52 that is weldedly connected to structural member 37b. The clevised end of each hydraulic cylinder 51 is pin connected at 53 to the bracket, thereby fixedly supporting the inner ends of same. An angle shaped thrust plate 54 is welded to the underside of each end section and extends at a right angle from the weld connection to and in engagement with the clevised end of the piston rod 51a of hydraulic cylinder 51. The inner ends of thrust plates 54 are connected with the clevised piston rods via pins 54a.

The combination thrust plate and pin connection 54 and 54a, respectively, support the outer end of the hydraulic cylinder via its piston 51a, thereby maintaining it in a horizontal plane. When the hydraulic cylinder is activated, the piston 51a extends against thrust plate 54. Since plate 54 is angled and approximates a right angle connection, the end sections are not in line with the direction of movement of the piston 51a and therefore a considerable degree of leverage is obtained for the purpose of swinging the end sections 46 on their swivel hinge connection discussed supra.

A fully extended piston 51a results in the end sections being folded for road travel, as seen in FIG. 1. When the hydraulic cylinder has withdrawn its piston, the end sections are nearly in line with the center section in their normal operating positions.

As seen in FIG. 8, a coil tension spring is connected to each end section at 56. The opposite end of spring 55 interconnects with chain 57, same being similar to a bicycle chain and operatively positioned on sprocket 50 and attached thereto by connecting pin 57a.

The tension spring 55 serves as a screen door type return spring for the end sections as they are swung on their swivel-type hinges. An important part of this spring biased return is the combination chain and sprocket and the angling of the sprocket relative to the center section. It may be seen in FIGS. 3 and 8, that the right hand end of the half sprocket is angled to the rear so that the sprocket teeth intermesh with the chain past the longitudinal vertical plane of the center section. In this manner, when end sections 46 are swung completely to the folded back position or near thereto, chain 57 will wrap on sprocket 50, each link contacting an appropriate tooth so that the tension on spring 55 is equalized rather than subjecting same to a severe pull. The fixed point of the chain is allowed to incrementally approach the spring as the spring is subject to more and more tension, thereby effectively limiting same.

When a force tending to maintain an end section 46 in its rearwardly swung position is no longer present, the spring tension exerted against the end section causes the return movement of same on its swivel hinge connection. As the spring biases the end sections to return, the chain 57 will unwrap from sprocket 50, causing equal tension on the spring during the return procedure because the fixed point is incrementally lengthened. This may become important during spraying in areas where foliage could restrict the full return of the end sections.

Each end section is supplied with a shock absorbing means consisting primarily of a cable 59 and a compression spring 60. The cable 59 is connected near the end extremity of each end section at 59a and extends back toward the lift structure through an aperture in mounting plates 31, and finally connecting with the end of compression spring 60 on the opposite side of structural member 22b. Since spring 60 is abutting the opposite side of a plate 31 relative to the connected end section, it will compress when tension is exerted on cable 59. As the end sections start their spring biased return, due to the connecting arrangement of the spring-chain-sprocket combination 55, 57 and 50, respectively, the equal return tension and biasing forces could cause the return of the end section to slam against the hinge connection too vigorously and damage all the related parts. The combination cable compression spring, 59 and 60, catches the return of each end section a preselected distance away from an "in line" position with center section 36 and absorbs the shock of the return in the compression spring. The final return of each end section to its normal operating position is then resiliently held at a slight angle to the rear by each combination cable-spring, 59 and 60, and "slam back" damage is successfully eliminated.

The combination spring return biasing arrangement of the end section in combination with the shock absorbing means is particularly useful when traveling over rough and irregular terrain or contacting possible field obstacles. For example, if during forward movement of the prime mover, an end section 46 strikes a stump 62, the end section will swing on its hinged connection to the rear until the obstructed end section has passed the obstacle. At that time, spring 55 urges the end section in its normal operating position and the shock absorbing arrangement, cable 59 and compression spring 60, precludes the attendant "slam back" injury. Likewise, chuck holes, rough and irregular terrain, including terraces, may cause one end section to dip, thusly necessitating the rearward movement discussed immediately above.

It should be understood that various types of plumbing and tank-hose arrangements may be used with the subject boom. Numeral 61 only schematically represents nozzles positioned along one end section 46, as seen in FIG. 8. Also the spraying of the liquids and hydraulic control of the boom may all be done by the operator located in the cab of prime mover 10.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In a field spraying apparatus having at least one plumbing supporting boom section carried on a mobile prime mover, the improvement comprising,
   a resilient shock absorbing means connected to said prime mover for effectively carrying the weight of said boom section,
   means for connecting said boom section to said resilient shock absorbing means, said connecting means including a pivotal lift structure connected to and resiliently supported by said shock absorbing means, said lift structure operable to be pivotally moved relative to said shock absorbing means, and
   means for connecting said boom section to said lift structure thereby enabling the vertical height of the boom section to be controlled by the pivotal movement of said lift structure.

2. The invention as in claim 1 wherein said pivotal lift structure includes at least four structural supports pivotally interconnected relative to each other in a parellelogram fashion with one of said structural supports being fixedly positioned in a preselected plane and connected to said shock absorbing means, and hydraulic lift means located between said shock absorbing means and at least one of the remaining structural supports for pivotally changing the elevation of same relative to said fixed support when said hydraulic means is activated.

3. The invention as in claim 1 wherein said resilient shock absorbing means includes
   a leaf spring fixedly connected at one end to the frame of the prime mover, and
   a means for supporting the center portion of said leaf spring in a fixed plane relative to said frame of said prime mover.

4. The invention as in claim 2 wherein said pivotal lift structure includes
   at least four structural supports pivotally interconnected relative to each other in a parallelogram fashion, one of said structural supports being fixedly positioned in a preselected plane and connected to said leaf spring, and
   hydraulic lift means located between said leaf spring and at least one of the remaining structural supports for pivotally changing the elevation of same relative to said fixed structural support when said hydraulic means is activated.

5. The invention as in claim 4 wherein said boom section connecting means includes
   a means for changing the angular positioning of said boom section relative to said parallelogram-like interconnected structures.

6. The invention as in claim 4 wherein said boom section includes
   a center section with an end section hingedly attached to each end thereof, and
   a means for biasing each end section toward the plane of the center section, thereby forming an elongated boom when in normal operating position, said means being operable to allow the end sections to swing rearwardly on said hinge attachments against said biasing means when the end sections contact an obstacle resisting forward movement of same.

7. The invention as in claim 6 wherein said biasing means includes
   a tension spring affixed between the center section and each of the end sections, and
   a means for maintaining equal tension on each of said end sections when said end sections are swung out of the normal operating position on said hinge connections relative to said center section.

8. The invention as in claim 7 wherein said last named means includes
   a sprocket connected to the center section immediately adjacent each end section hinge connection,
   a chain interconnected between the center section and each tension spring, said chain adapted to operatively ride on its respective sprocket as its corresponding end section is swung on said hinge connection, thereby changing the effective length of said chain and maintaining equal tension on said tension spring.

9. The invention as in claim 8 wherein each end section includes
   a second shock absorbing means for preventing slam back injury to said boom sections due to the return biasing effect of said tension spring.

10. The invention as in claim 1 wherein said boom section connecting means includes
    a shaft fixedly connected to said lift structure,
    a hub, said hub rotatively mounted on said shaft, said boom section fixedly connected to said hub, and
    means for locking said hub at a plurality of positions on said hub thereby effectively changing the orientation of said boom section relative to said prime mover.

References Cited

UNITED STATES PATENTS

| 3,011,724 | 12/1961 | Eastep | 239—164 |
| 3,110,359 | 11/1963 | Solomon | 182—63 |

FOREIGN PATENTS

| 154,959 | 4/1953 | Australia. |
| 525,182 | 5/1956 | Canada. |
| 767,240 | 7/1934 | France. |
| 1,258,384 | 3/1961 | France. |

HENRY C. SUTHERLAND, *Primary Examiner.*